United States Patent [19]

Wilkinson

[11] 4,358,774
[45] Nov. 9, 1982

[54] APPARATUS AND METHOD FOR CONTROLLING FOCUS IN A RECORDING SYSTEM

[75] Inventor: Richard L. Wilkinson, Torrance, Calif.

[73] Assignee: Discovision Associates, Costa Mesa, Calif.

[21] Appl. No.: 167,941

[22] Filed: Jul. 14, 1980

[51] Int. Cl.$^3$ ............................................. G01D 15/14
[52] U.S. Cl. .................................... 346/1.1; 346/76 L; 346/108; 369/45; 250/204
[58] Field of Search ...................... 346/76 L, 108, 1.1; 369/44–46, 111; 358/128.5, 128.6; 250/201, 202, 204

[56] References Cited

U.S. PATENT DOCUMENTS

| | | | |
|---|---|---|---|
| 3,932,700 | 1/1976 | Snopko | 369/46 |
| 3,952,191 | 4/1976 | Tinet | 369/45 X |
| 4,074,312 | 2/1978 | van Rosmalen | 369/45 |
| 4,209,793 | 6/1980 | Ueno | 346/76 L X |

Primary Examiner—A. D. Pellinen
Assistant Examiner—W. J. Brady
Attorney, Agent, or Firm—Ronald J. Clark

[57] ABSTRACT

A control system for maintaining proper focus of a radiant recording or writing beam, such as a laser beam, with respect to a recording surface, by measurement of the duty cycle of an oscillatory information-carrying signal recorded from the recording surface immediately after recording. The system includes a photodetector for detecting a reading beam used to recover the recorded information, a focusing lens movable with respect to the recording surface to focus the writing and reading beams, a dither oscillator to generate a dither signal employed to move the focusing lens in an oscillatory manner, a duty cycle detector to provide a signal indicative of the duty cycle of the information-carrying signal recovered by the reading beam, and a multiplier for comparing the phases of the duty cycle signal and the dither oscillator signal, and thereby providing a correction signal indicative of the magnitude and polarity focus error. This control system provides fine focus control, and is utilized in conjunction with a coarse focus control comprising a focus detector, differential amplifier and feedback path to the movable focusing lens. In addition, the signal from the duty cycle detector can be coupled to maintain the power of the writing beam at an optimum level and to maintain the duty cycle at a constant level, such as fifty percent.

16 Claims, 9 Drawing Figures

APPARATUS AND METHOD FOR CONTROLLING FOCUS IN A RECORDING SYSTEM

BACKGROUND OF THE INVENTION

This invention relates generally to radiant beam focusing arrangements and, more particularly, to control systems in which a focusing lens is moved automatically to maintain a radiant beam accurately focused on a moving surface, such as a recording surface.

There are a number of known techniques for positioning a lens automatically in response to signals generated by a photosensitive detector indicating focus errors. For example, in one type of video playback device, a disc is rotated on a turntable, and is scanned by a light beam which is accurately focused by an objective lens onto an information track on the disc surface. A reflected beam of light returned from the information track is directed to a photocell detector, from which is derived a control signal for varying the position of the lens to maintain focus. In most cases, information signals are also derived from the same detector, as are control signals for adjusting the position of the detector radially with respect to the information track on the disc.

Typically, the information track in such a system is of the order of one micron wide. Accordingly, there is a requirement for accurately focusing the beam to a spot of about one micron in diameter on the video disc. It can be seen that slight variations in the distance between the objective lens and the disc surface can result in loss of recorded information, as well as in the introduction of undesirable frequency components into the resulting electrical signal.

The problem of focus control is even more critical in video disc recording systems. In one type of system, the information track on the disc comprises a relatively uniform sequence of pits or recesses formed in the disc surface by a laser beam. On playback, the disc surface exhibits a different optical characteristic, such as reflectivity, as a reading beam traverses it, and a cyclicly varying carrier signal can be derived from the disc during playback. The carrier signal in one system is frequency modulated with an information signal derived from a video program source, or from some other information source. Ideally, the laser beam that performs the information writing steps has to be appropriately focused and controlled in power to produce depressions and intervening lands on the disc surface such that the duty cycle associated with the recesses and lands is fifty percent. More specifically, the recesses should be so spaced and dimensioned that the signal recovered from the disc will have a value that is above its average magnitude for fifty percent of the time, and below it average for fifty percent of the time. Any other duty cycle results in the introduction of undesirable harmonic distortion of the recovered signal. Clearly, the control of the focus of the writing beam is critical in achieving this goal. Whenever the beam is out of focus, in either direction, a wider writing beam is obtained, which may not have sufficient intensity to form a recess as large as is needed to maintain a fifth percent duty cycle.

One way of controlling the focus in a recording system of this general type is to employ a separate reading laser beam directed onto the information track formed by the writing laser beam through the same focusing lens as the writing beam. The reading beam obtained from the newly formed information track is directed to a focus detector, from which will be derived an electrical signal indicative of the error in the focal position of the lens. This error signal is fed back to a lens driving motor to effect a correction of the focus position. Although satisfactory for some applications, this type of control system is not highly accurate, especially over long periods of time. Typically periodic readjustment of the control system is required, to compensate for drifts in characteristics of the electrical components used, and in laser power output. Accordingly, prior to this invention there has been a significant need for a focusing control system that does not require periodic readjustment and is more precise than control systems of the prior art. The present invention satisfies this need.

SUMMARY OF THE INVENTION

The present invention resides in apparatus, and a related method, for automatically focusing reading and writing beams in an optical recording system, such as a disc recording system. In common with other recording systems of the same general type, the apparatus of the invention includes beam focusing means movable with respect to a recording surface to focus one or more beams thereon, a first radiant energy source to provide a writing beam, a second radiant energy source to provide a reading beam, each of the beams being directed through the focusing means, and reading beam detection means for receiving a reflected reading beam from the recording surface.

Briefly, and in general terms, the apparatus of the invention further includes a dither oscillator coupled to move the focusing means in an oscillatory manner, duty cycle detection means coupled to the reading beam detection means to provide a measure of the duty cycle of the recorded and recovered signal, and means for generating a focus correction signal from the output of the duty cycle detection means and the dither oscillator. The effect of the dither oscillator is to vary the duty cycle at the dither frequency, if the beams are substantially out of focus. Moreover, the phase of the variation in duty cycle will depend upon the sense or direction in which the beams are out of focus. More specifically, the dither oscillator will produce an in-phase variation in duty cycle when the beams are out of focus in one direction and an out-of-phase variation in duty cycle when the beams are out of focus in the opposite direction. When both beams are essentially in focus, the dither oscillator will produce a variation in duty cycle at twice the dither frequency.

More specifically, the means for generating the focus correction signal includes a bandpass filter selected to pass only the dither frequency and twice the dither frequency, and a multiplier to multiply the filtered output from the duty cycle detection means and a phase-compensated form of the dither signal output from the dither oscillator. The resulting output from the multiplier is further processed by a low-pass filter, to derive the average value of the signal, the magnitude and polarity of which will provide a correction signal to be applied to the focusing means.

Since the concept of focus control by duty cycle detection can be employed only when a recording signal is being recorded at some duty cycle greater than zero and less than one hundred percent, means must also be provided for a coarse adjustment of focus, to ensure that duty cycle detection will operate successfully as a fine adjustment means. In the presently preferred embodiment, the coarse adjustment means includes a focus detector, to provide an output indicative of focus error, and this output is fed back to the focusing means.

In accordance with another aspect of the present invention, the output of the duty cycle detection means is also coupled to the first radiant energy source, providing the writing beam, in such a manner that the power supplied to the source, which is a laser in the preferred embodiment, is automatically adjusted to provide a fifty-percent duty cycle when the beam is in focus. In this manner, the recording process will be constantly controlled to provide a fifty-percent duty cycle, regardless of the condition of various factors that tend to change the duty cycle. For example, in a disc recording system, portions of the information track located closer to the center of the disc are recorded at a lower recording speed than those at the periphery of the disc. Consequently, it is easier to form recesses in the disc surface near its center. Stated another way, the laser power threshold level above which formation of the recesses takes place is lower toward the center of the disc than toward the periphery. Controlling the power of the writing laser in accordance with the invention provides a fifty-percent duty cycle throughout the recording process, regardless of the speed of movement of the recording surface.

It will be appreciated from the foregoing that the present invention represents a significant advance in the field of radiant beam recording systems. In particular, it provides a precise technique for automatically maintaining reading and writing beams in focus, as well as for maintaining the power of the writing beam at an optimum level. Other aspects and advantages of the present invention will become apparent from the following more detailed description, taken in conjunction with the accompanying drawings.

DESCRIPTION OF THE PREFERRED EMBODIMENT

Figure 1:
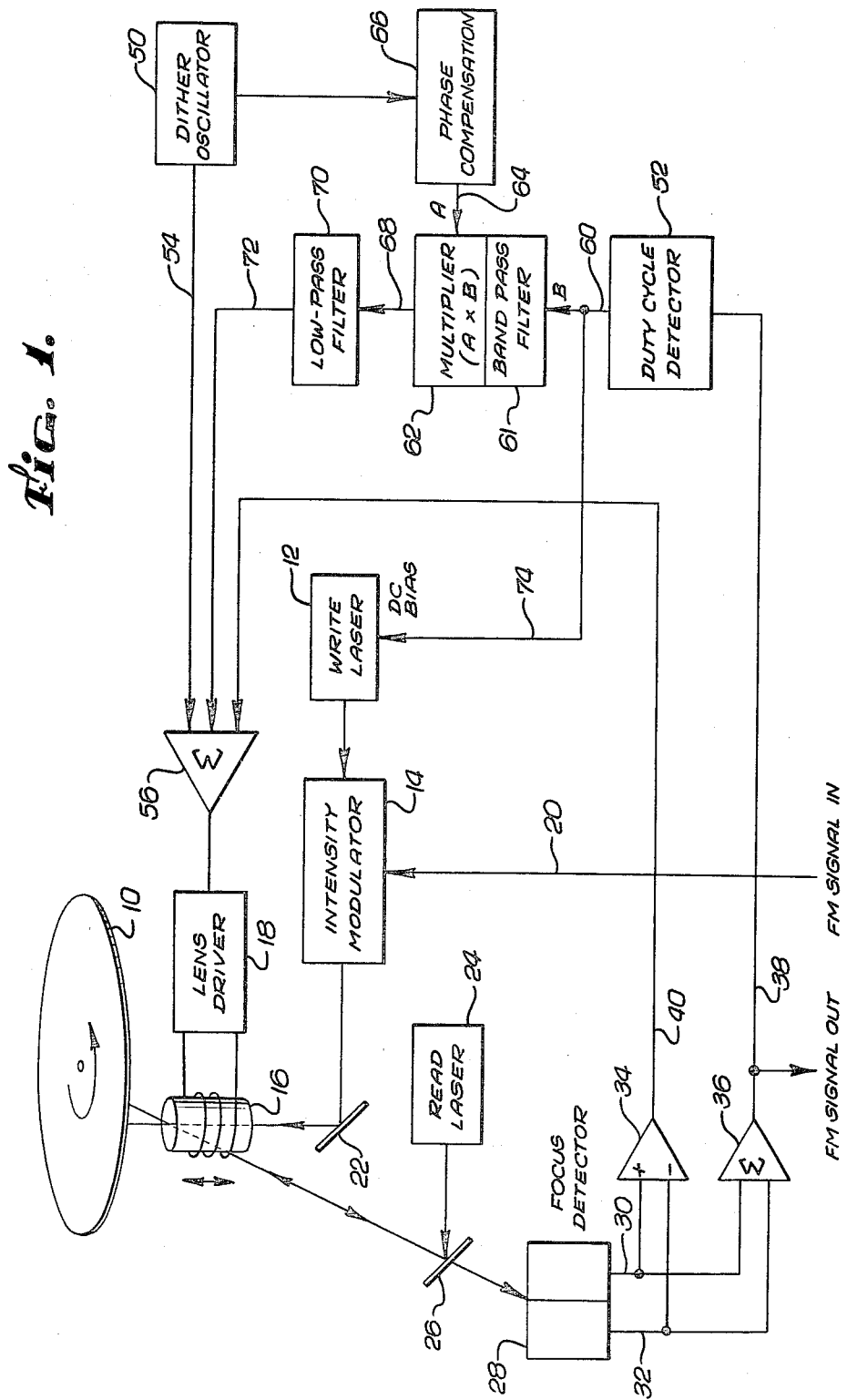
FIG. 1 is a simplified schematic and block diagram of a recording system embodying the present invention.

As shown in the drawings for purposes of illustration, the present invention is principally concerned with the automatic control of focus in a recording system employing a radiant beam to record information on a recording surface. The invention is particularly well suited for use in a disc recording system employing laser beams both for writing information permanently on a recording surface on the disc and for subsequently reading the information back from the disc, or from a manufactured copy of the disc. Such recording systems are now commonly employed in the video disc recording art.

A recording system of this general type includes a rotatable disc, indicated by reference numeral 10 in FIG. 1, a writing laser 12, intensity modulator 14, a focusing lens 16, and a lens drive motor 18 coupled to the focusing lens in such a manner as to move it perpendicularly with respect to the recording surface of the disc. The writing laser 12 provides a laser beam to the intensity modulator 14, which modulates the laser power between its maximum level and zero, in accordance with a cyclic information-carrying signal provided on line 20 to the modulator. The intensity modulator 14 may include a Pockels cell or any other device for varying the intensity of the beam in accordance with the modulating signal on line 20.

The modulating signal in the illustrative embodiment is a sinusoidal carrier signal of very high frequency, which may be frequency-modulated with an information signal to be recorded on the disc, such as a video information signal. After modulation in the intensity modulator, the writing beam is reflected by a mirror 22 through the focusing lens 16 and onto the recording surface of the disc 10. Typically, an information track of the order of one micron in width is employed in a recording system of this general type. Accordingly, the control of focus of the writing beam is a critical element in the recording system. The writing beam forms pits or recesses along the information track by interaction with a surface material on the disc. The physical process by means of which the recesses are formed is not critical to the invention. There may, for example, be a controlled combustion of the surface material. In any event, the resultant information tracks exhibits a varying reflectivity, or other optical property, when scanned by a reading beam.

In the disclosed embodiment the reading beam is generated by a reading laser 24, and is directed onto the disc 10 through a beam splitter, indicated at 26, and through the same focusing lens 16 that is employed by the writing beam. A portion of the reading portion of the reading beam is reflected from the disc surface back along the same path to the beam splitter 26, and thence to a focus detector 28. The focus detector 28 may be of any suitable type that provides an indication of the focus of the reading and writing beams on the disc, as well as a measure of the total power content of the reading beam reflected back from the disc. Preferably, the focus detector 28 is of the split-diode type described and claimed in a co-pending patent application Ser. No. 168,812 by John S. Winslow entitled "Focus Detector."

The focus detector has two output lines 30 and 32, which are connected to the respective input terminals of a differential amplifier 34 and to the input terminals of a summing amplifier 36. The summing amplifier provides the recovered frequency-modulated output information signal as read from the disc after recording, and the output of the differential amplifier 34, in line 40, is fed back to the lens drive motor 18 to provide a coarse correction for errors in focus of the two beams. Although the servo loop including the focus detector 28, differential amplifier 34, lens driver 18 and lens 16, works satisfactorily to provide a coarse adjustment of focus on an automatic basis, it lacks the desired precision for high quality recording systems, and has the further disadvantage that manual adjustment is required to compensate for gradual drift in electrical characteristics of the components, and for mechanical tolerances of the control system elements.

In accordance with the invention, fine control of beam focus is obtained by use of a dither oscillator 50 and a duty cycle detector 52 to measure the effect of dither oscillations on the duty cycle of the recorded information, and to generate a focus correction signal for application to the lens drive motor 18. More specifically, the dither oscillator 50 provides an oscillatory output of, for example, 30 hertz, over line 54 to a summing amplifier 56, where the dither signal is summed with the correction signal received over line 40 from differential amplifier 34, before application to the lens drive motor 18, over line 58.

The output of the summing amplifier 36, on line 38, is connected to the duty cycle detector 52, which provides on output line 60 a signal indicative of the instantaneous duty cycle of the recorded signal as detected by the reading beam. The duty cycle is defined as the proportion of time that the signal is below its average value. It will be appreciated that the duty cycle could equally well be defined as the proportion of time that the signal is above its average value. The first definition, however, is consistent with the directions of other variables described herein. When the duty cycle is fifty precent, the signal is below its average value for 50 percent of the time and above its average value for the other 50 percent of the time.

The detailed design of the duty cycle detector 52 is not critical to the invention. It may, for example, take the form shown in FIG. 3 of a copending, commonly assigned application of the same inventor, Ser. No. 86,775 entitled "Apparatus for Optically Recording an Information Signal with Reduced Second Harmonic Distortion."

The duty cycle signal on line 60 is input to a high pass filter 61 and thence to a multiplier 62, the other input of which is provided on line 64 derived from the dither oscillator 50, through a phase compensation circuit 66. As will be discussed with reference to FIGS. 2a–2g, the multiplier 62 yields an output on line 68 indicative of focus error. This error signal is further processed by a low-pass filter 70, to remove dither and higher frequency components, and is transmitted over line 72 to the summing amplifier 56, for application to the lens drive motor 18. As will also be further discussed below, the duty cycle signal on line 60 is also transmitted to the writing laser 12, over line 74, to effect control of the power supplied to the writing laser.

Figure 3:
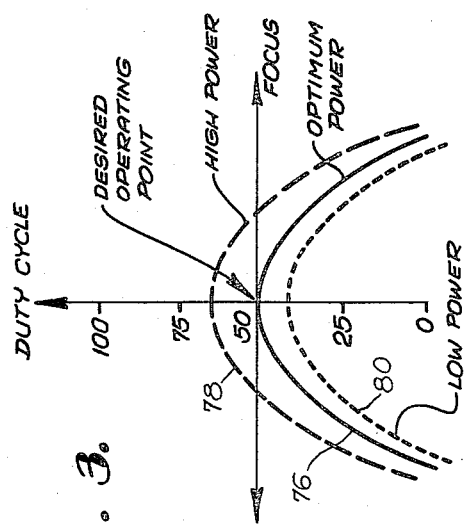
FIG. 3 is a graphical representation of the variation of duty cycle with beam focus at constant laser power.

To appreciate how the control system of the invention operates, it is first necessary to examine the relationship between duty cycle and focus, as illustrated graphically in FIG. 3. Focus is plotted along the horizontal or x axis in FIG. 3, and the desired in-focus condition is represented by the zero point along the x axis, while non-zero x ordinates represent conditions under which the focusing lens 16 is displaced perpendicularly with respect to the surface of the disc 10. The duty cycle is plotted along the vertical or y axis in FIG. 3, and the origin is shown as being at a fifty percent duty cycle. The curve plotted as a solid line 76 repersents the relationship between duty cycle and focus for a constant maximum power applied to the writing laser. For purposes of discussion of the focusing system, it should be noted that when the focusing lens 16 moves away from the desired focus point in either direction, the duty cycle falls off, i.e., decreases from the in-focus duty cycle value of fifty percent. The reason for this is that, when the writing beam is out of focus, its intensity is diminished and it can no longer form recesses in the recording surface sufficiently large to provide a fifty percent duty cycle. Consequently, the duty cycle falls off as the beams are moved out of focus in either direction.

Figure 2A:
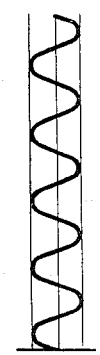
FIGS. 2a-2g are timing diagrams illustrating the waveforms of electrical signals obtained at various points in the schematic diagram of FIG. 1.
Figure 2B:
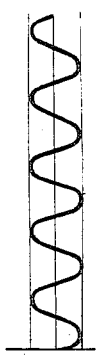

FIG. 2a shows a typical dither signal provided from the dither oscillator 50 and applied to the lens driver 18 to oscillate the focusing lens 16 up and down about an average position. In this regard, it should be noted that the terms "up" and "down" are intended to mean further away and closer, respectively, with respect to the disc, and not necessarily up and down in a gravitational sense. FIG. 2b indicates the effect of the dither signal on the duty cycle when the focusing lens is positioned much too high with respect to the proper focus position, i.e., the focus position is to the right of the origin point of FIG. 3. It will be seen that the curve to the right of the origin in FIG. 3 has a negative slope, and that an upward movement of the focusing lens will result in a decrease in the duty cycle. Accordingly, the duty cycle detector output will be as shown in FIG. 2b, which it will be seen is 180 degrees out of phase with the original dither signal shown in FIG. 2a.

Figure 2C:

Likewise, it will be appreciated that the curve to the left of the origin in FIG. 3 has a positive slope, and that an upward movement of the focusing lens will result in an increase in the duty cycle. Accordingly, the effect of the dither signal when the focusing lens is substantially too low with respect to its in-focus position will be as shown in FIG. 2c, i.e., the variation in duty cycle will be exactly in phase with the dither signal. At the focus point, a dither signal will result in a double-frequency oscillation of the duty cycle, as shown in FIG. 2d, since movement of the focusing lens either up or down from the focus point will result in a decrease in the duty cycle.

Figure 2D:
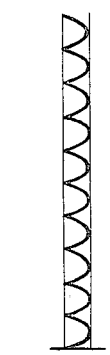
Figure 2E:
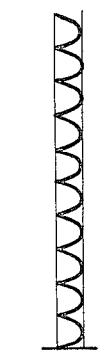
Figure 2F:
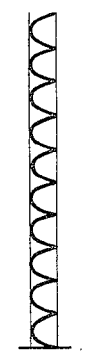
Figure 2G:
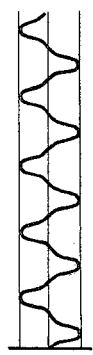

When the signals shown in FIGS. 2b–2d are bandpass filtered in the filter 61, in which the steady-state or slowly varying components of the duty cycle signal are eliminated, and only the oscillatory components remain, specifically those components having the dither cycle frequency and twice the dither cycle frequency. The oscillatory signals are then multiplied by the dither signal in the multiplier 62, which yields the respective signals shown in FIGS. 2e–2g. It will be seen that FIG. 2e has a negative average value, FIG. 2f has a positive average value and FIG. 2g has a zero average value, the latter being indicative of a perfect focus condition. The output of the multiplier 62 is appropriately filtered in the low-pass filter 70, to obtain the average value indicative of an error or correction signal to be applied to the lens drive motor 18.

As shown in FIG. 1, the output of the duty cycle detector 52 may also be used to provide a dc bias signal on line 74 to the writing laser 12. It will be seen from FIG. 3 that, for a constant laser power higher than the optimum power indicated by curve 76, the duty cycle in the recording track will be higher than fifty percent when the beams are in focus. This is indicated by the broken line 78. Similarly, the broken line 80 indicates a typical constant power curve with a power lower than the optimum, in which case the duty cycle will be lower than fifty percent when the beams are in focus. In order to provide an output that is as free as possible of harmonic distortion, it is desirable to have the recording track formed at a fifty-percent duty cycle. The control loop including the duty cycle detector and feedback circuit over line 74 to the writing laser 12, effectively accomplishes this end. When the duty cycle exceeds fifty percent because of a too high power setting, a dc bias of one polarity will be applied to the laser 12 and will have the effect of reducing the maximum laser power by an amount proportional to the departure of the duty cycle from the desired fifty percent level. In similar fashion, if the duty cycle falls below fifty percent, a dc bias of opposite polarity will be applied to the laser 12, to increase its maximum power accordingly. The writing laser 12 is so adjusted that a zero dc bias signal on line 74 will result in an optimum laser power just sufficient to provide fifty percent duty cycle.

As an alternative to the arrangement illustrated in FIG. 1, the output of the duty cycle detector 52 need not be applied directly to the bandpass filter 61, but indirectly, through the writing laser over line 74, as shown. A photodetector (not shown) used in conjunction with the writing laser 12, could then be employed to provide an output signal to the bandpass filter 63, and thence to the multiplier 62.

It will be appreciated from the foregoing that the present invention provides a novel technique for automatically focusing a light beam on a recording surface during a recording process, by detecting the duty cycle of a recovered oscillatory recorded signal and comparing it with a signal generated by a dither oscillator connected to move the focusing lens of the system. Use of this control system in combination with a conventional focus detector to provide a coarse control of the focus, results in an overall control system that is more precise than any previously available, and is not subject to drift in the performance characteristics of its components. Moreover, the use of this focus control system in combination with a laser power control system further enhances the recording system in which it is used. Not only is the focus of the recording beam accurately controlled, but the power of the recording beam is also controlled to an optimum fifty-percent duty cycle level.

It will also be appreciated that, although a particular embodiment of the invention has been described in detail for purposes of illustration, various modifications may be made without departing from the spirit and scope of the invention. Accordingly, the invention is not to be limited except as by the appended claims.

I claim:

1. For use in a recording system employing a radiaent writing beam to record an information-carrying cyclic signal on a moving recording surface, apparatus for automatically maintaining the beam in focus on the recording surface, said apparatus comprising:
   focusing means through which the writing beam passes, said focusing means being movable with respect to the recording surface to adjust the focus of the beam with respect to the surface;
   a radiant beam source providing a reading beam directed through said focusing means and reflected from the recording surface to retrieve information therefrom;
   beam detection means disposed in the path of the reflected reading beam, to provide a retrieved information-carrying signal;
   duty cycle detection means for generating from the retrieved information-carrying signal a duty cycle signal indicative of the proportion of time that the magnitude of the information-carrying signal is on a selected side of an average value line for the signal;
   dither oscillator means, for generating an oscillatory signal for application to said focusing means;
   means for comparing the duty cycle signal with the dither signal, to obtain a focus correction signal; and
   summing means for adding the dither signal and the focus correction signal for application to said focusing means.

2. Apparatus as set forth in claim 1, wherein said means for comparing the duty cycle signal and the dither signal includes:
   phase compensation means, for providing a dither signal of which the phase is compensated for constant phase shifts of the dither signal occurring between the point of its application to said focusing means and the point of its use in said means for comparing;
   a high pass filter for passing only dither-frequency and multiple-dither-frequency components in the duty cycle signal;
   a multiplier for generating a product signal proportional to the product of the filtered duty cycle signal and the phase-compensated dither signal; and
   a low-pass filter for obtaining the focus correction signal from the product signal.

3. Apparatus as set forth in claim 1, wherein:
   said beam detection means includes means for generating a signal indicative of focus error; and
   the signal indicative of focus error is transmitted to said summing means as a coarse focus correction signal.

4. Apparatus as set forth in claim 1, wherein the duty cycle signal is also employed as a control signal to vary the power of the writing beam to maintain the duty cycle at desired level.

5. Apparatus as set forth in claim 4, wherein the desired level of the duty cycle is fifty percent.

6. For use in a recording system employing a radiant writing beam to record an oscillatory information-carrying signal on a moving recording surface, apparatus for automatically maintaining the writing beam in focus on the recording surface, said apparatus comprising:
   a first radiant beam source to provide the writing beam;
   means for modulating the intensity of the writing beam in accordance with an oscillatory information-carrying signal;
   a focussing lens for focussing the writing beam onto the recording surface;
   lens translating means for moving the focusing lens with respect to the recording surface to adjust the focus of the beam;
   a second radiant beam source to provide a reading beam directed through said focusing lens and reflected from the recording surface to retrieve the information-carrying signal;
   photo-electric detection means disposed in the path of the reflected reading beam and generating a first output signal indicative of focus error and a second output signal indicative of total light power of the reflected reading beam;
   duty cycle detection means for generating from said second output signal a duty cycle signal indicative of the proportion of time that said second output signal has a value below its average value;
   a dither oscillator for generaing a relatively low frequency dither signal for application to said lens translating means;
   a bandpass filter for isolating components of said duty cycle signal due to the dither signal;
   a phase compensation circuit for adjusting the phase of the dither signal by an amount equal to the constant phase shifts occurring between said lens translating means and said bandpass filter;

means for comparing the phase of the bandpass-filtered duty cycle signal with the phase-compensated dither signal, to obtain a signal containing a component indicative of focus error;

a low-pass filter to remove dither-frequency and higher-frequency components from the signal containing a component indicative of focus error; and signal summing means, for combining the dither signal, the first output from said photoelectric detection means, and the filtered signal indicative of focus error, and applying a resultant control signal to said lens translating means;

whereby the duty cycle signal contains a component in phase with the phase-compensated dither signal if the focus error is in one direction, and contains a component oppositely phased to the phase-compensated dither signal if the focus error is in the opposite direction, and whereby the first output signal from said photoelectric detection means provides a coarse focus correction signal and the output from said low-pass filter provides a fine focus correction signal.

7. Apparatus as set forth in claim 6, wherein said means for comparing phase includes a multiplier.

8. Apparatus as set forth in claim 6, wherein the duty cycle signal is also employed to control the power of said first radiant beam source to maintain the duty cycle at a substantially constant level.

9. Apparatus as set forth in claim 8, wherein the duty cycle is maintained at approximately fifty percent.

10. For use in a recording system employing a radiant writing beam to record an information-carrying cyclic signal on a moving recording surface, apparatus for automatically maintaining the beam in focus on the recording surface, said apparatus comprising:

means for dithering the focus condition of the beam in an oscillatory manner in accordance with a dither signal;

means for reading the information-carrying signal back from the recording surface immediately after it has been recorded;

means for processing the information-carrying signal to obtain a duty cycle signal indicative of the proportion of time that the information-carrying signal is either above or below its average value; and means for comparing the duty cycle signal with the dither signal to obtain a focus correction signal to maintain the writing beam substantially in proper focus.

11. Apparatus as set forth in claim 10, wherein said means for comparing includes:

a high pass filter to obtain components of the duty cycle signal due to the dither signal;

a multiplier for obtaining a product signal proportional to the product of the filtered duty cycle signal and a phase-compensated dither signal; and a low-pass filter for filtering out dither signal components from the product signal to obtain the focus correction signal.

12. Apparatus as set forth in claim 10, wherein the duty cycle signal is also employed to control the power of the writing beam to maintain the duty cycle at a constant level.

13. For use in a recording system employing a radiant writing beam to record an information-carrying signal on a moving recording surface, a method for automatically controlling the focus of the beam on the recording surface, said method comprising:

dithering the focus condition of the beam in an oscillatory manner in accordance with a dither signal;

reading the information-carrying signal back from the recording surface immediately after it has been recorded;

processing the information-carrying signal to obtain a duty-cycle signal indicative of the duty cycle of the signal obtained in said reading step with respect to its average value;

comparing the duty cycle signal with the dither signal to obtain a focus correction signal; and correcting the beam focus in accordance with the correction signal obtained in said comparing step.

14. A method as set forth in claim 13, wherein said comparing step includes:

high pass filtering the duty cycle signal to eliminate all signal components except those due to the dither signal;

multiplying the filtered duty cycle signal by a phase-compensated form of the dither signal to obtain a product signal; and low-pass filtering the product signal to obtain the focus correction signal.

15. A method as set forth in claim 13, and further including the step of controlling the writing beam power in response to variations in the duty cycle signal, to maintain the duty cycle at a constant level.

16. A method as set forth in claim 15, wherein said controlling step maintains the duty cycle at approximately fifty percent.

* * * * *

UNITED STATES PATENT AND TRADEMARK OFFICE
CERTIFICATE OF CORRECTION

PATENT NO. : 4,358,774
DATED : November 9, 1982
INVENTOR(S) : Richard L. Wilkinson It is certified that error appears in the above-identified patent and that said Letters Patent are hereby corrected as shown below:

Column 1, Line 62, delete "fifth" and insert --fifty--.

Column 4, line 50, delete "in" and insert --on--.

Column 7, line 39, delete "radiaent" and insert --radiant--.

Column 8, line 60, delete "generaing" and insert --generating--.

Signed and Sealed this

Twelfth Day of July 1983

[SEAL]

Attest:

GERALD J. MOSSINGHOFF

Attesting Officer     Commissioner of Patents and Trademarks